United States Patent [19]
Camp, Jr. et al.

[11] Patent Number: 6,097,974
[45] Date of Patent: Aug. 1, 2000

[54] COMBINED GPS AND WIDE BANDWIDTH RADIOTELEPHONE TERMINALS AND METHODS

[75] Inventors: William O. Camp, Jr., Chapel Hill; Robert Ray Horton, Apex; Paul Wilkinson Dent, Pittsboro, all of N.C.

[73] Assignee: Ericsson Inc., Research Triangle Park, N.C.

[21] Appl. No.: 08/989,508

[22] Filed: Dec. 12, 1997

[51] Int. Cl.[7] ..................................................... H04Q 7/20
[52] U.S. Cl. ...................... 455/575; 370/342; 342/357.1; 455/552
[58] Field of Search .................................... 455/427, 437, 455/426, 552, 12.1, 553, 575, 48, 180.1, 188.1, 456; 370/280, 320, 347, 335, 342, 350; 342/357.1

[56] References Cited

U.S. PATENT DOCUMENTS

| | | | |
|---|---|---|---|
| 4,829,591 | 5/1989 | Hashimoto et al. | 455/89 |
| 5,043,736 | 8/1991 | Darnell et al. | 342/357.1 |
| 5,379,320 | 1/1995 | Fernandes et al. | 375/1 |
| 5,414,432 | 5/1995 | Penny, Jr. et al. | 342/357 |
| 5,511,233 | 4/1996 | Otten | 455/56.1 |
| 5,654,717 | 8/1997 | Nichols et al. | 342/357.1 |
| 5,708,440 | 1/1998 | Trimble et al. | 342/357 |
| 5,758,261 | 5/1998 | Wiedeman | 455/13.1 |
| 5,794,159 | 8/1998 | Portin | 455/553 |
| 5,889,492 | 3/1999 | Kurby et al. | 342/357 |
| 5,945,944 | 8/1999 | Krasner | 342/357.06 |
| 5,987,377 | 11/1999 | Westerlage et al. | 701/204 |

FOREIGN PATENT DOCUMENTS

| | | |
|---|---|---|
| 0 871 342 A2 | 10/1998 | European Pat. Off. . |
| WO 97/14058 | 10/1995 | WIPO ............................. G01S 5/14 |
| WO 97/14056 | 4/1997 | WIPO . |

OTHER PUBLICATIONS

Parkinson et al., "Global Position System: Theory and Applications, Vol. 1", Progress in Astronautics and Aeronautics, vol. 163, pp. 29–37, 330–351.

Lee, "*Mobile Cellular Telecommunications Analog and Digital Systems, Second Edition*", McGraw–Hill, Inc., 1995, pp. 502–533.

International Search Report, PCT/US98/24641, Mar. 23, 1999.

*Primary Examiner*—Edward F. Urban
*Assistant Examiner*—Tilahun Gesesse
*Attorney, Agent, or Firm*—Myers Bigel Sibley & Sajovec

[57] ABSTRACT

Wireless mobile terminals include a GPS Radio Frequency (RF) receiver and a wide bandwidth radiotelephone RF receiver having bandwidth that is at least half as wide as the GPS RF signal chip frequency. The wireless mobile terminals also include a shared Intermediate Frequency (IF) section that is responsive to both the GPS RF receiver and to the wide bandwidth radiotelephone RF receiver. A demodulator such as a CDMA despreader is responsive to the shared IF section. Thus, common circuitry may be provided except for the separate GPS RF receiver and wide bandwidth radiotelephone RF receiver. Low cost manufacturing and high efficiency operations may thereby be provided.

21 Claims, 9 Drawing Sheets

COMBINED GPS AND WIDE BANDWIDTH RADIOTELEPHONE TERMINALS AND METHODS

FIELD OF THE INVENTION

The present invention generally relates to wireless communications systems and methods, and more particularly, to receivers for wireless mobile terminals.

BACKGROUND OF THE INVENTION

Wireless communication systems are commonly employed to provide voice and data communications to a plurality of subscribers within a prescribed geographic area. For example, analog cellular radiotelephone systems, such as those designated AMPS, ETACS, NMT-450, and NMT-900, have been deployed successfully throughout the world. Recently, digital cellular radiotelephone systems such as those designated IS-54B (and its successor IS-136) in North America and GSM in Europe have been introduced and are currently being deployed. These systems, and others, are described, for example, in the book entitled *Cellular Radio Systems*, by Balston, et al., published by Artech House, Norwood, Mass. (1993). In addition to the above systems, an evolving system referred to as Personal Communication Services (PCS) is being implemented. Examples of current PCS systems include those designated IS-95, PCS-1900, and PACS in North America, DCS- 1800 and DECT in Europe, and PHS in Japan. These PCS systems operate at the 2 gigahertz (GHz) band of the radio spectrum, and are typically being used for voice and high bit-rate data communications.

Figure 1:
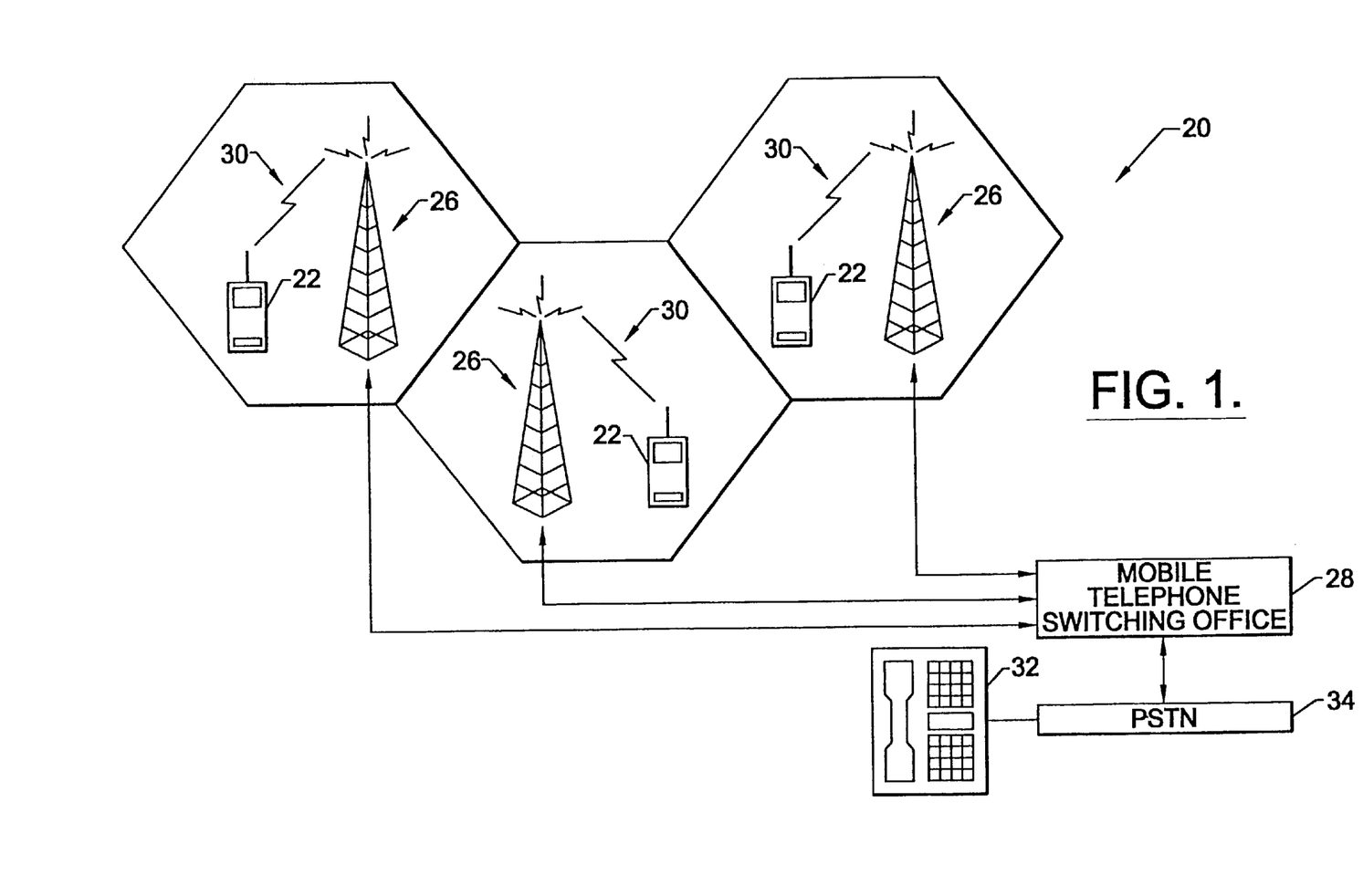
FIG. 1 illustrates a conventional terrestrial (cellular) wireless communication system.

FIG. 1 illustrates a conventional terrestrial wireless communication system 20 that may implement any one of the aforementioned wireless communications standards. The wireless system may include one or more wireless mobile terminals 22 that communicate with a plurality of cells 24 served by base stations 26 and a Mobile Telephone Switching Office (MTSO) 28. Although only three cells 24 are shown in FIG. 1, a typical cellular radiotelephone network may comprise hundreds of cells, may include more than one MTSO 28 and may serve thousands of wireless mobile terminals 22.

The cells 24 generally serve as nodes in the communication system 20, from which links are established between wireless mobile terminals 22 and an MTSO 28, by way of the base stations 26 servicing the cells 24. Each cell 24 will have allocated to it one or more dedicated control channels and one or more traffic channels. The control channel is a dedicated channel used for transmitting cell identification and paging information. The traffic channels carry the voice and data information. Through the communication system 20, a duplex radio communication link 30 may be effected between two wireless mobile terminals 22 or between a wireless mobile terminal 22 and a landline telephone user 32 via a Public Switched Telephone Network (PSTN) 34. The base station 26 generally handles the radio communications between the cell 24 and the wireless mobile terminal 22. In this capacity, the base station 26 may function as a relay station for data and voice signals.

Figure 2:
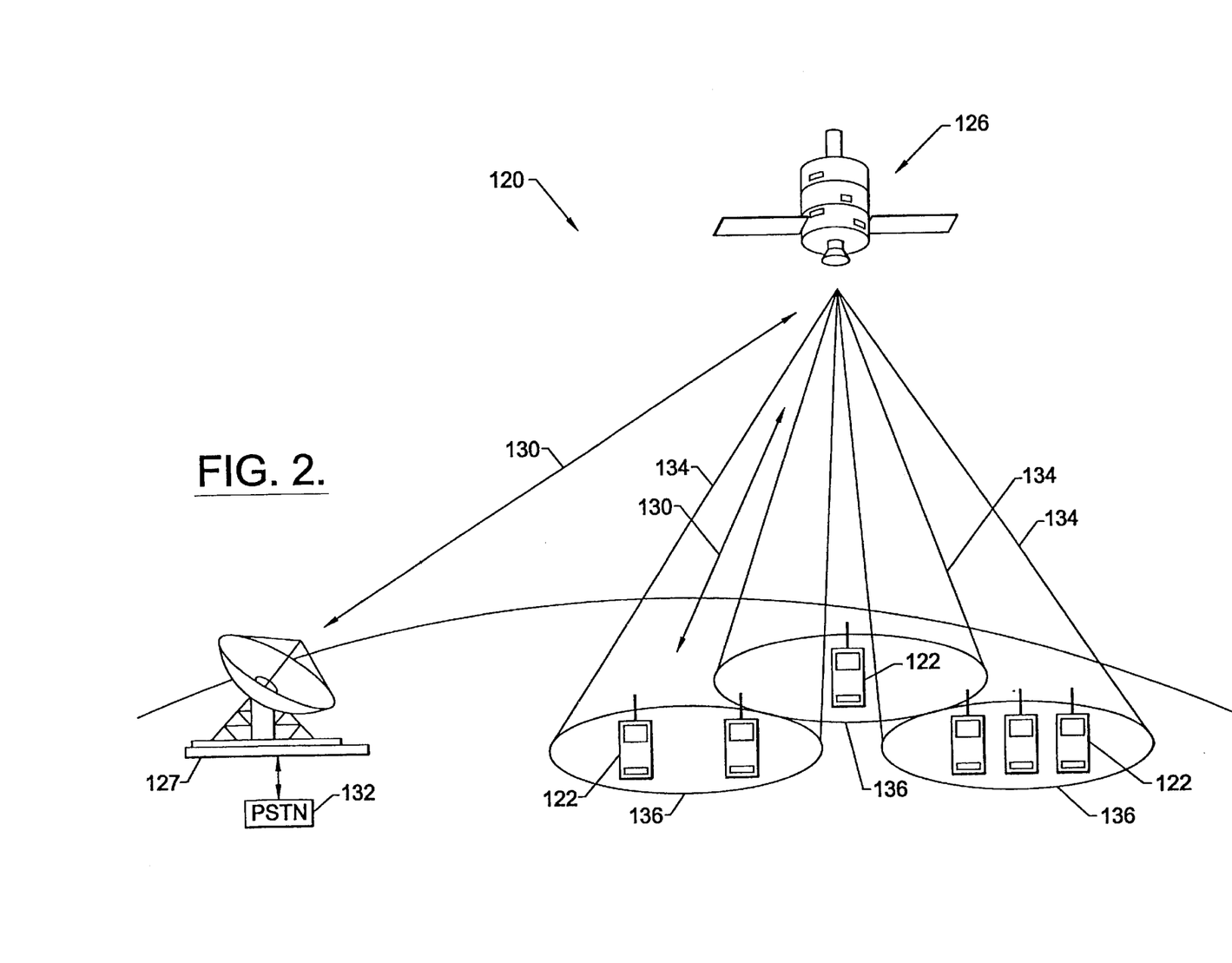
FIG. 2 illustrates a conventional celestial (satellite) wireless communication system.

FIG. 2 illustrates a conventional celestial wireless communication system 120. The celestial wireless communication system 120 may be employed to perform similar functions to those performed by the conventional terrestrial wireless communication system 20 of FIG. 1. In particular, the celestial wireless communication system 120 typically includes one or more satellites 126 that serve as relays or transponders between one or more earth stations 127 and satellite wireless mobile terminals 122. The satellite 126 communicates with the satellite wireless mobile terminals 122 and earth stations 127 via duplex communication links 130. Each earth station 127 may in turn be connected to a PSTN 132, allowing communications between the wireless mobile terminals 122, and communications between the wireless mobile terminals 122 and conventional terrestrial wireless mobile terminals 22 (FIG. 1) or landline telephones 32 (FIG. 1).

The celestial wireless communication system 120 may utilize a single antenna beam covering the entire area served by the system, or as shown in FIG. 2, the celestial wireless communication system 120 may be designed such that it produces multiple, minimally-overlapping beams 134, each serving a distinct geographical coverage area 136 within the system's service region. A satellite 126 and coverage area 136 may serve a function similar to that of a base station 26 and cell 24, respectively, of the terrestrial wireless communication system 20.

Thus, the celestial wireless communication system 120 may be employed to perform similar functions to those performed by conventional terrestrial wireless communication systems. In particular, a celestial radiotelephone communication system 120 may have particular application in areas where the population is sparsely distributed over a large geographic area or where rugged topography tends to make conventional landline telephone or terrestrial wireless infrastructure technically or economically impractical.

As the wireless communication industry continues to advance, other technologies will most likely be integrated within these communication systems in order to provide value-added services. One such technology being considered is a Global Positioning System (GPS). Therefore, it would be desirable to have a wireless mobile terminal with a GPS receiver integrated therein. It will be understood that the terms "global positioning system" or "GPS" are used to identify any spaced-based system that measures positions on earth, including the GLONASS satellite navigation system in Europe.

Figure 3:
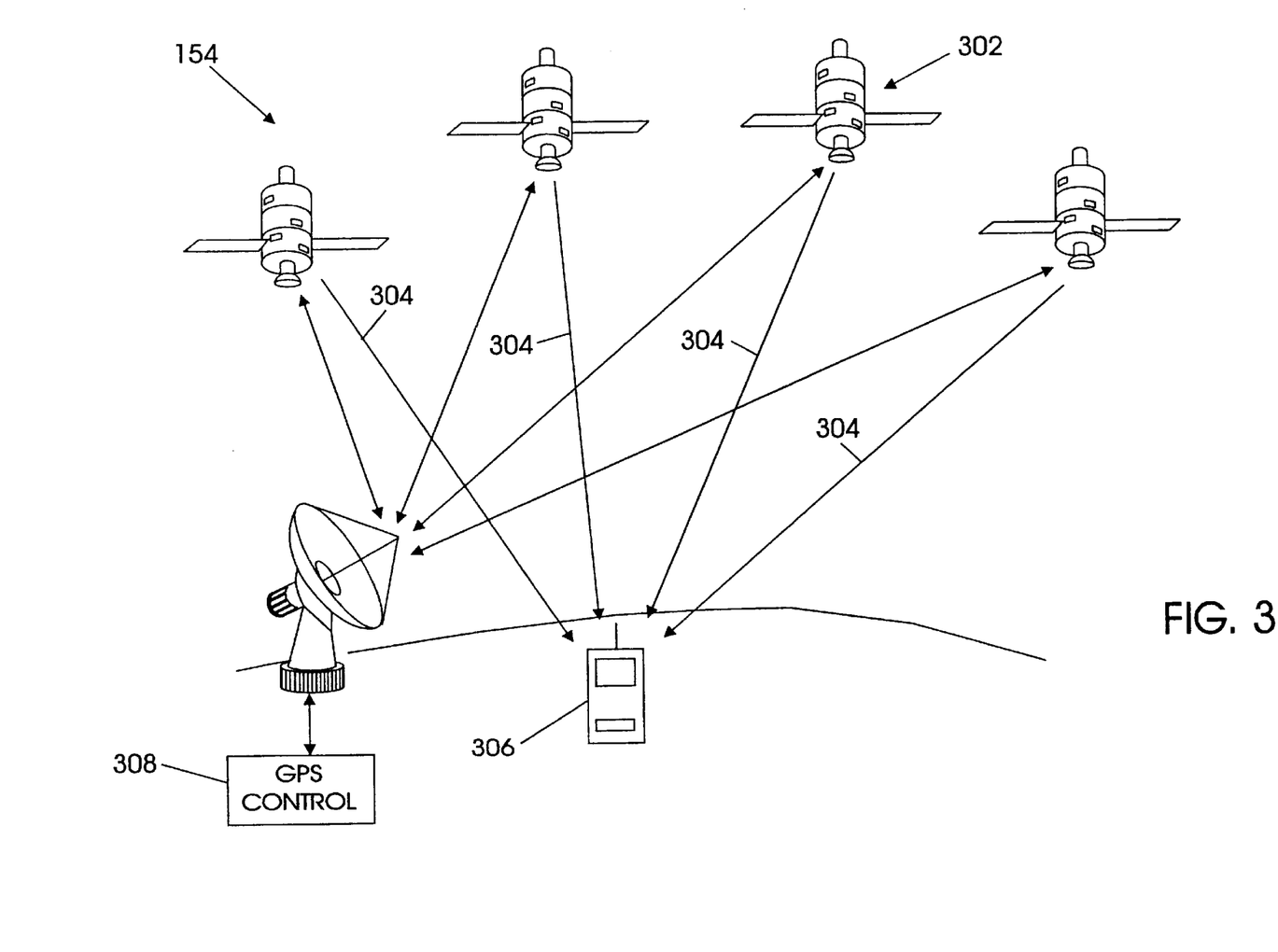
FIG. 3 illustrates a global positioning system (GPS).

A GPS system is illustrated in FIG. 3. As is well known to those having skill in the art, GPS is a space-based triangulation system using satellites 302 and computers 308 to measure positions anywhere on the earth. GPS was first developed as a defense system by the United States Department of Defense as a navigational system. Compared to other land-based systems, GPS may be unlimited in its coverage, may provide continuous 24-hour coverage regardless of weather conditions, and may be highly accurate. While the GPS technology that provides the greatest level of accuracy has been retained by the government for military use, a less accurate service has been made available for civilian use.

In operation, a constellation of 24 satellites 302 orbiting the earth continually emit a GPS radio frequency signal 304 at a predetermined chip frequency. A GPS receiver 306, e.g., a hand-held radio receiver with a GPS processor, receives the radio signals from the closest satellites and measures the time that the radio signals take to travel from the GPS satellites to the GPS receiver antenna. By multiplying the travel time by the speed of light, the GPS receiver can calculate a range for each satellite in view. From additional information provided in the radio signal from the satellites, including the satellite's orbit and velocity and correlation to its onboard clock, the GPS processor can calculate the position of the GPS receiver through a process of triangulation.

SUMMARY OF THE INVENTION

It is therefore an object of the present invention to provide wireless mobile terminals having a Global Positioning System (GPS) receiver integrated therein.

It is another object of the invention to provide a wireless mobile terminal having a GPS receiver integrated therein that can be inexpensive to manufacture and efficient in operation.

These and other objects are provided, according to the present invention, by a combined GPS and wide bandwidth radiotelephone wireless mobile terminal that shares many components. In particular, according to the present invention, it has been realized that the GPS receiver function and some celestial or terrestrial radiotelephone standards share a common IF bandwidth. Moreover, some celestial or terrestrial radiotelephone standards share a common task to process a signal to find long code lengths therein. Thus, the only major remaining difference may be the different radio frequencies that are received.

Wireless mobile terminals according to the present invention include a GPS Radio Frequency (RF) receiver and a wide bandwidth radiotelephone RF receiver having bandwidth that is at least half as wide as the GPS signal chip frequency. The wireless mobile terminals also include a shared Intermediate Frequency (IF) section that is responsive to both the GPS RF receiver and to the wide bandwidth radiotelephone RF receiver. A demodulator is responsive to the shared IF section. Thus, common circuitry may be provided except for the GPS RF front end and wide bandwidth radiotelephone RF front end, which operate at different frequencies. However, both front ends may be manufactured in a single, dual-band front end for low cost manufacturing. High efficiency operations may thereby be provided.

In a preferred embodiment of the present invention, the wide bandwidth radiotelephone RF receiver is a Code Division Multiple Access (CDMA) RF receiver, including a Universal Mobile Terminal System (UMTS), also known as wideband CDMA, or a Time Division Multiple Access (TDMA) RF receiver. Both CDMA and TDMA RF receivers may have bandwidth on the order of 1 MHz wide, which is comparable to GPS bandwidths. Thus, apart from the different RF spectra that are received, many components can be shared. For CDMA, the demodulator is preferably a CDMA spread spectrum despreader. For TDMA, the demodulator is preferably a TDMA demodulator.

In fact, due to the similar bandwidths, a combined GPS/CDMA receiver can be provided wherein the CDMA receiver has the identical bandwidth as the GPS receiver. In this case, IF and demodulation can be combined efficiently.

Portions of the GPS RF receiver and the TDMA/CDMA RF receiver can also be combined. For example, a dual band antenna may be provided wherein the GPS RF receiver includes a GPS RF filter that is responsive to the dual band antenna and wherein the wide bandwidth radiotelephone RF receiver comprises a spread spectrum RF filter that is responsive to the dual band antenna. A shared wide bandwidth RF amplifier and filter may then be provided in the RF section.

Other embodiments of the present invention may provide separate GPS and CDMA/TDMA IF sections wherein all components are separate or wherein some components such as a local oscillator are shared. In yet other embodiments, a common demodulator such as a despreader is provided, but all other components are separate.

Methods of receiving wireless communications in a mobile terminal according to the invention include the steps of receiving GPS RF signals at a predetermined chip frequency on a first RF channel and receiving wide bandwidth radiotelephone RF signals on a second RF channel, wherein the wide bandwidth radiotelephone RF signals have bandwidth that is at least half as wide as the GPS RF signal chip frequency. The GPS RF signals and the wide bandwidth radiotelephone RF signals are then demodulated in a shared demodulator. The demodulator can include a shared mixer. Accordingly, high efficiency, low cost wireless mobile terminals and wireless communication receiving methods may be provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention stems from the realization that the GPS receiver function and some radiotelephone standards share a common IF bandwidth and that some of these standards also share a common task to process a signal to find a long code length. Accordingly, components of a GPS receiver and a wide bandwidth radiotelephone receiver may be efficiently combined to produce wireless mobile terminals and receiving methods that are capable of efficient, low cost operation.

The details of GPS systems and wide bandwidth radiotelephone systems such as CDMA and TDMA systems are well known to those having skill in the art, and need not be described in detail below. Similarly, the subsystems that comprise each of these systems are also well known to those having skill in the art and need not be described in detail. Accordingly, the present Detailed Description will describe, on a block diagram level, various embodiments that can illustrate efficient combination of GPS receivers and wide bandwidth radiotelephone receivers.

Figure 4:
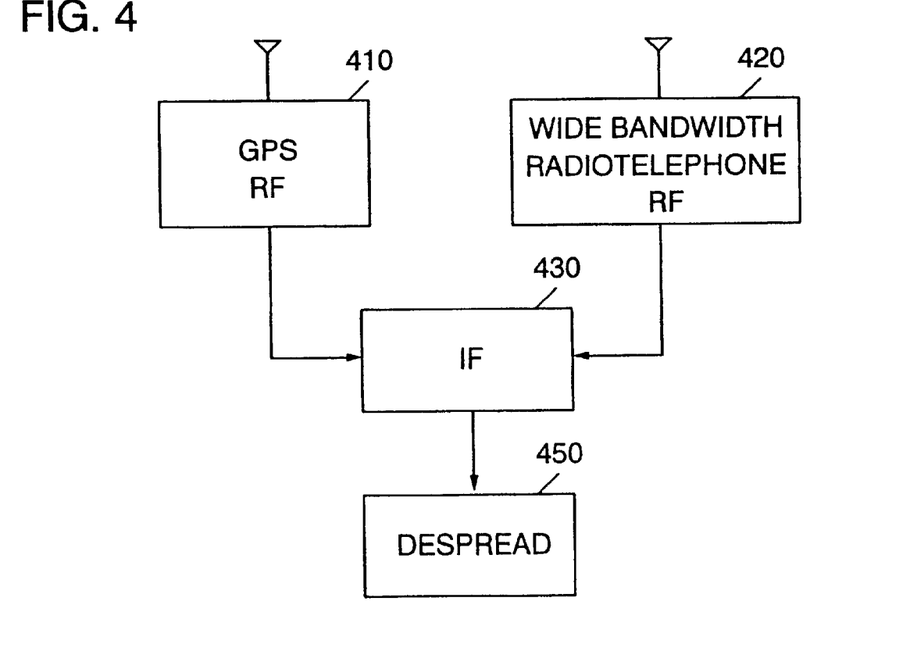
FIGS. 4–9 are block diagrams of wireless mobile terminals and wireless communication receiving methods according to the present invention.

Referring now to FIG. 4, wireless mobile terminals and wireless communication receiving methods according to the present invention are shown. As shown in FIG. 4, wireless mobile terminals and methods according to the present invention include a GPS RF receiver 410 and a wide bandwidth radiotelephone RF receiver 420 having bandwidth that is at least half as wide as that of the GPS RF signal chip frequency. A shared IF section 430 is responsive to both the GPS RF receiver 410 and to the wide bandwidth radiotelephone RF receiver 420. A demodulator such as a despreader 450 is responsive to the shared IF section.

Preferably, the wide bandwidth radiotelephone RF receiver 420 is a CDMA or TDMA RF receiver. Also preferably, the GPS RF receiver 410 and the wide bandwidth radiotelephone RF receiver 420 have similar bandwidth in different RF spectra. Most preferably, the GPS RF receiver 410 and the wide bandwidth radiotelephone RF receiver 420 have identical bandwidth in different RF spectra.

More particularly, there are many cellular telephone standards that have IF bandwidths of about 30 KHz, such as the AMPS or digital AMPS standard, or about 270 KHz, such as the GSM standard. These narrow bandwidths may be insufficient for receiving the 1 MHz wide GPS signal. However, there are many cellular telephone standards that do have IF bandwidths of at least 1 MHz. These include the IS-95 CDMA standard with a bandwidth of 1.2 MHz, the Digital European Cordless Telephone (DECT) TDMA standard having a bandwidth of about 1 MHz and a proposed Japanese CDMA standard having a bandwidth of up to 5 MHz wide. Satellite communication systems are also being designed and developed having similar wide bandwidths as well as CDMA signal processing, such as GLOBALSTAR. Accordingly, the present invention can provide shared IF processing of the GPS and wide bandwidth radiotelephone signals and a shared despreading process including demodulation/correlation/ baseband processing. Accommodation may be made for the differing RF frequencies that are received at similar bandwidths.

Figure 10:
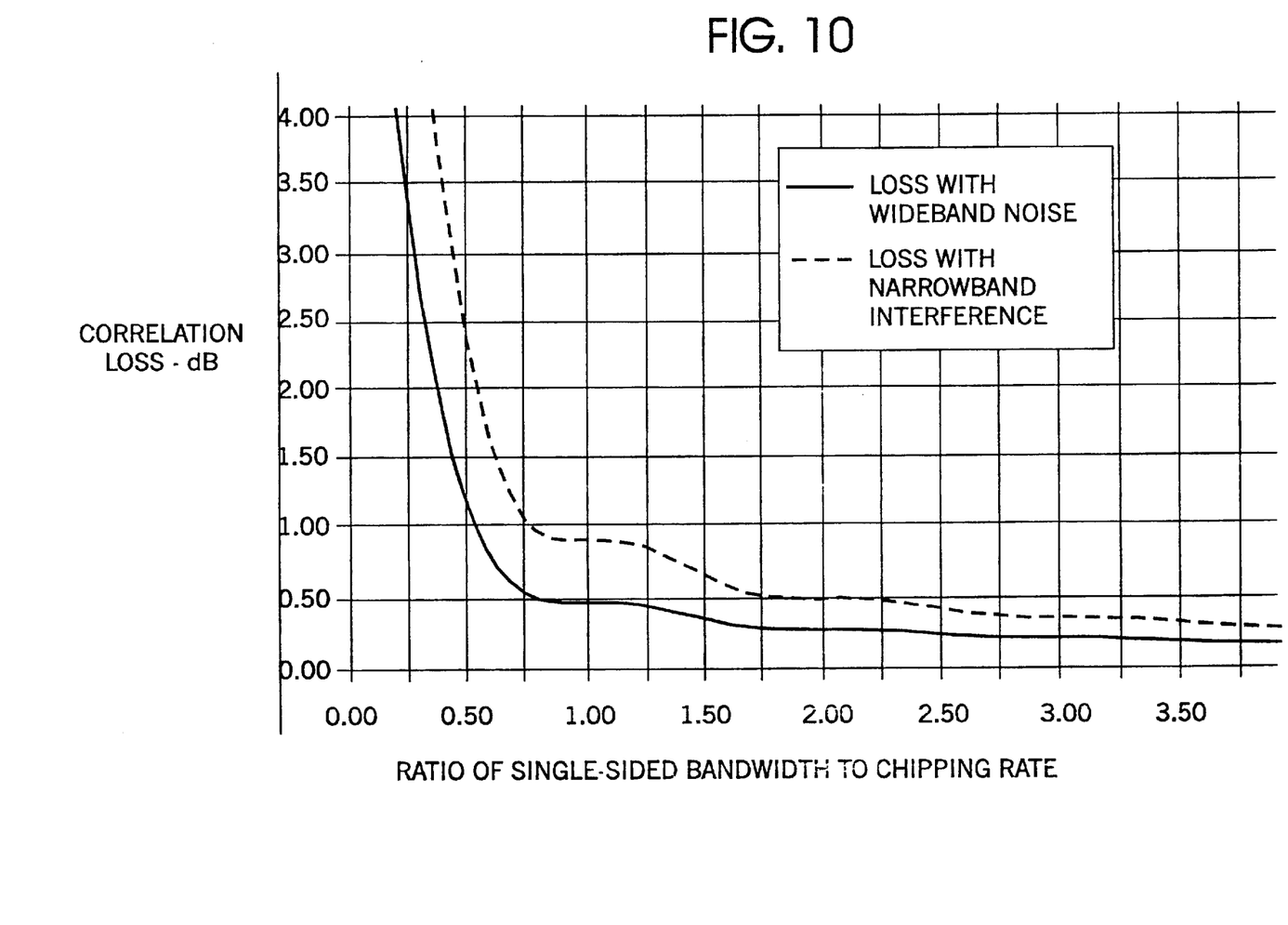
FIG. 10 graphically illustrates correlation loss caused by filtering in a GPS receiver.

In particular, it is known that the correlation loss caused by filtering in a GPS receiver is a function of the ratio of bandwidth to frequency. This correlation loss rapidly increases for bandwidths that are less than 50% of the chip frequency. See FIG. 10, which is a reproduction of FIG. 12 of the textbook entitled "Global Positioning System: Theory and Applications, Vol. 1", p. 351, the disclosure of which is hereby incorporated herein by reference. For example, if the chipping rate is 1.023 MHz, and if up to a 3 dB loss is acceptable, then the single-sided bandwidth (half bandwidth) of the receiver can be 0.25×1.023 MHz or about 255 KHz. The total bandwidth is then about 511 KHz, or about half the chip rate. As shown in FIG. 10, at lower bandwidths, correlation loss increases rapidly.

Figure 5:
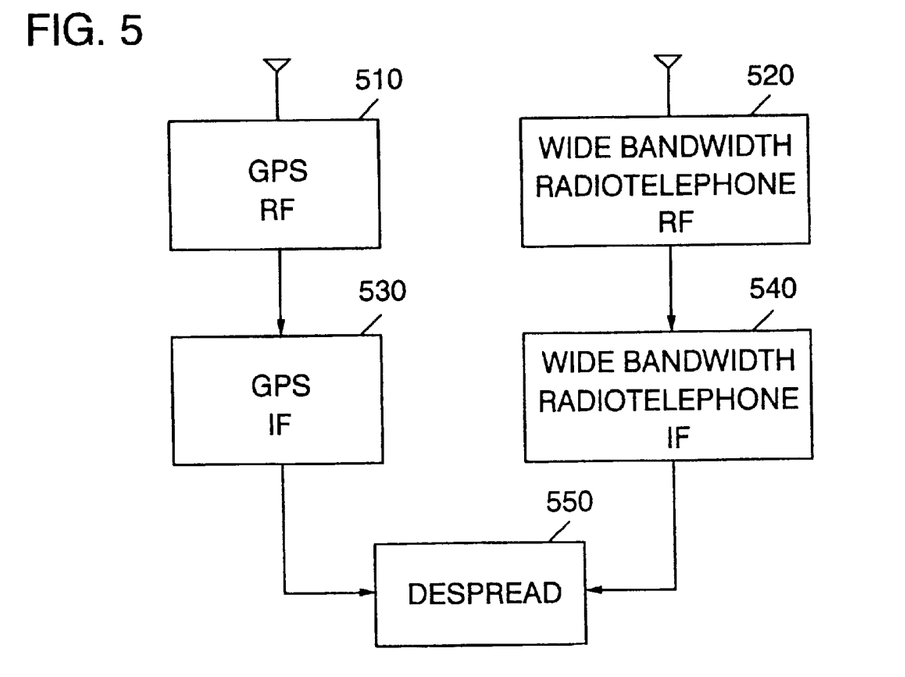

FIG. 5 illustrates another general embodiment of the present invention. In this embodiment, a separate GPS RF receiver 510 and wide bandwidth radiotelephone RF receiver 520 are provided, as well as a separate GPS IF section 530 and wide bandwidth radiotelephone IF section 540. A common demodulator such as despreader 550 is also provided. This embodiment may be desirable where it is preferred to provide separate IF sections.

Figure 6:
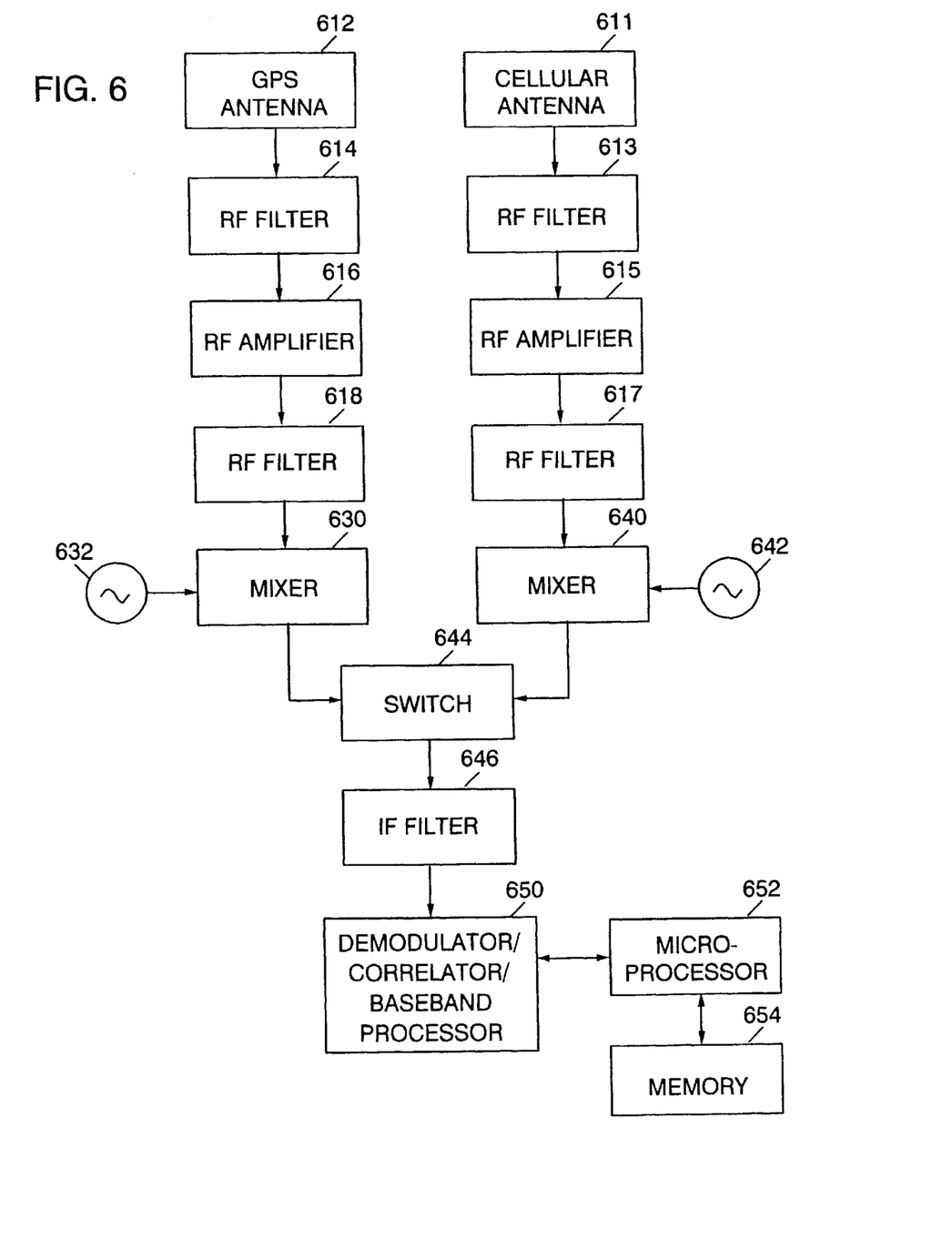

Referring now to FIG. 6, a more detailed embodiment of combined GPS/wide bandwidth radiotelephone terminals and methods is illustrated. As shown in FIG. 6, a GPS RF section includes GPS antenna 612, RF filter 614, RF amplifier 616 and RF filter 618. The wide bandwidth radiotelephone RF section includes cellular antenna 611, RF filter 613, RF amplifier 615 and RF filter 617. A separate GPS mixer 630 and wide bandwidth radiotelephone mixer 640 is provided, each of which uses a separate local oscillator 632 and 642 respectively. A switch 644 is provided to switch between the GPS and wide bandwidth radiotelephone systems. A shared IF filter 646 and a shared demodulator such as despreader 650 (demodulator/correlator/base band processor) is provided. Similarly, a common microprocessor 652 and memory 654 is provided.

It will be understood by those having skill in the art that the terminals and methods of FIG. 6 may be obtained by adding GPS antenna 612, RF filter 614, RF amplifier 616, RF filter 618, mixer 630, local oscillator 632 and switch 644 to a conventional CDMA cellular telephone terminal, to permit the combined unit to act in a dual mode GPS/CDMA mode depending on the setting of switch 644 and the digital processing of the signal in the correlator/base band processor 650 and microprocessor 652. The software may need to be adjusted to search for different codes and slightly different code chip rates, and then use that information appropriately for either task.

For GPS reception, the code phase shifts may be found for each satellite that is visible, and data demodulation may permit time and ephemeris data to be obtained. Within the microprocessor 652, the data is combined to determine location. In cellular telephone usage, the code polarity is data that is further processed in a CODEC to produce voice reception. It will also be understood that, for clarity, FIG. 6 does not illustrate the transmit path that is used in a CDMA cellular telephone terminal.

It will also be understood that in the terminals and methods of FIG. 6, code phase shifts may be obtained for each satellite that is visible, as determined from an internal almanac or from information supplied via a cellular telephone link. That information may be stored in the memory 654, and then modes may be switched from GPS reception to CDMA cellular telephone usage. That code phase shift information may be sent over the cellular telephone link to a server where the location is determined using additional information that is obtained at a central point.

Figure 7:
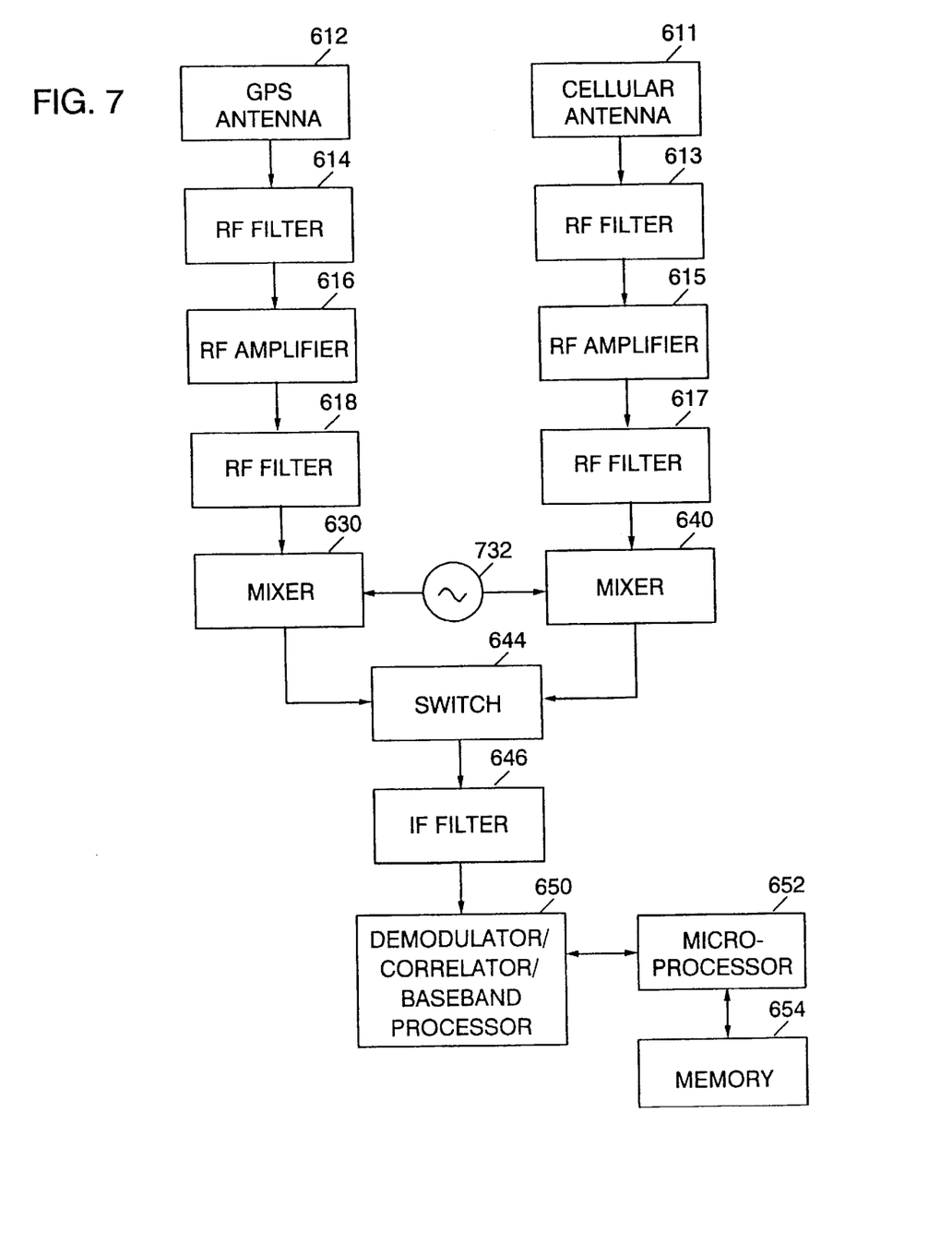

Referring now to FIG. 7, an alternate embodiment of the present invention is illustrated. The elements of FIG. 7 correspond to those of FIG. 6 except that a common oscillator 732 is used for both the GPS mixer 630 and the wide bandwidth radiotelephone mixer 640. The use of a common local oscillator in a dual mode GPS/radiotelephone terminal is described in Application Ser. No. 08/925,566, entitled "Systems and Methods for Sharing Reference Frequency Signals Within a Wireless Mobile Terminal Between a Wireless Transceiver and a Global Positioning System Receiver", to coinventors Horton and Camp, Jr., assigned to the assignee of the present invention, the disclosure of which is hereby incorporated herein by reference. In the embodiment of FIG. 7, the circuit that controls the oscillator 732 may be adjusted to supply the appropriate frequency signal and permit reception of either GPS or wide band radiotelephone signals.

Figure 8:
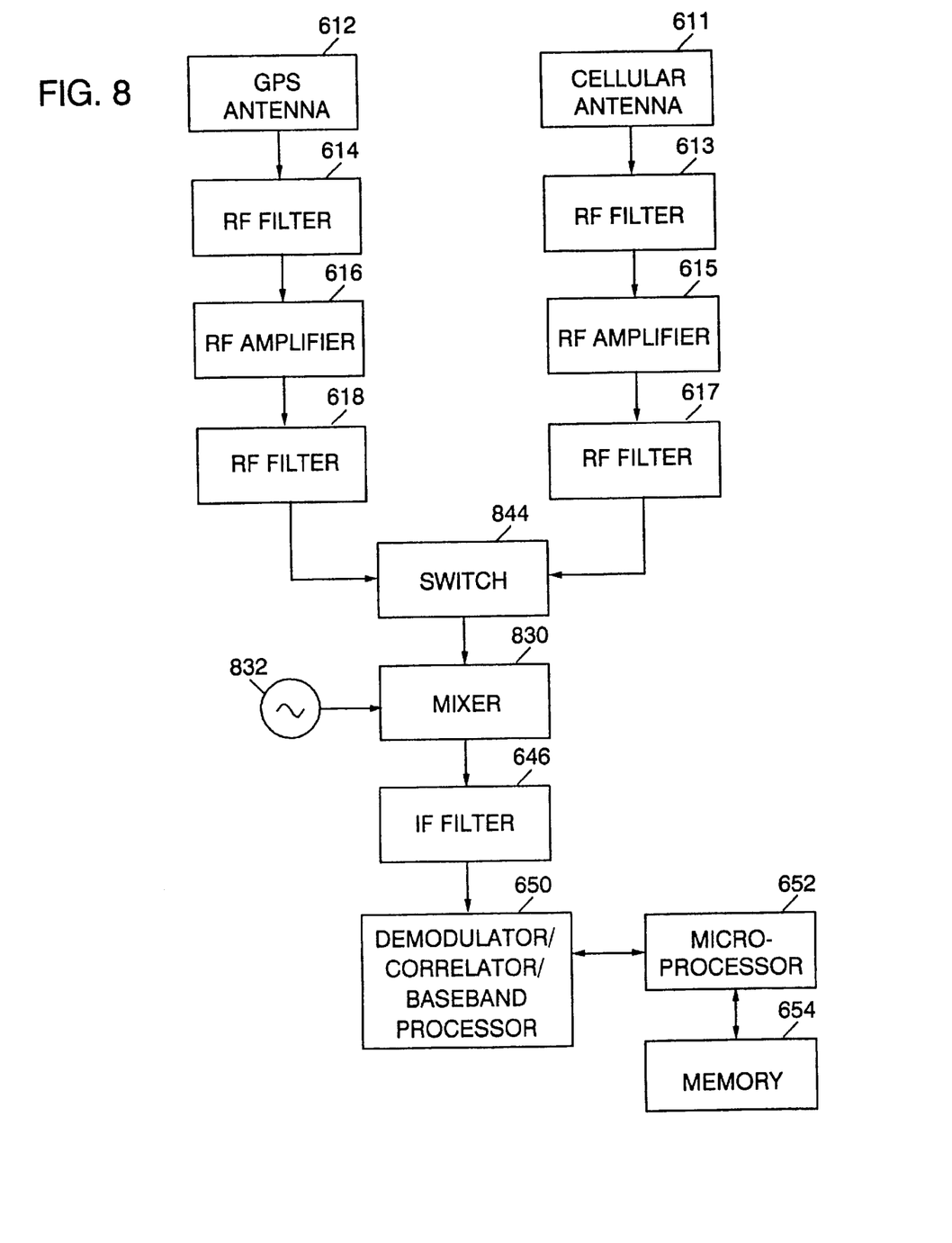

FIG. 8 illustrates another embodiment wherein a common mixer 830 and a common local oscillator 832 are provided. Thus, switch 844 is used to switch the two RF signals into the mixer 830. As with FIG. 7, the oscillator may be readjusted to supply the appropriate frequency signal.

Similar architectures may be used for GPS/DECT and GPS/WCS terminals and methods. In DECT, which does not have a correlator function, digital hardware may need to be supplied with a firmware/software program to perform correlation within the digital resources.

Figure 9:
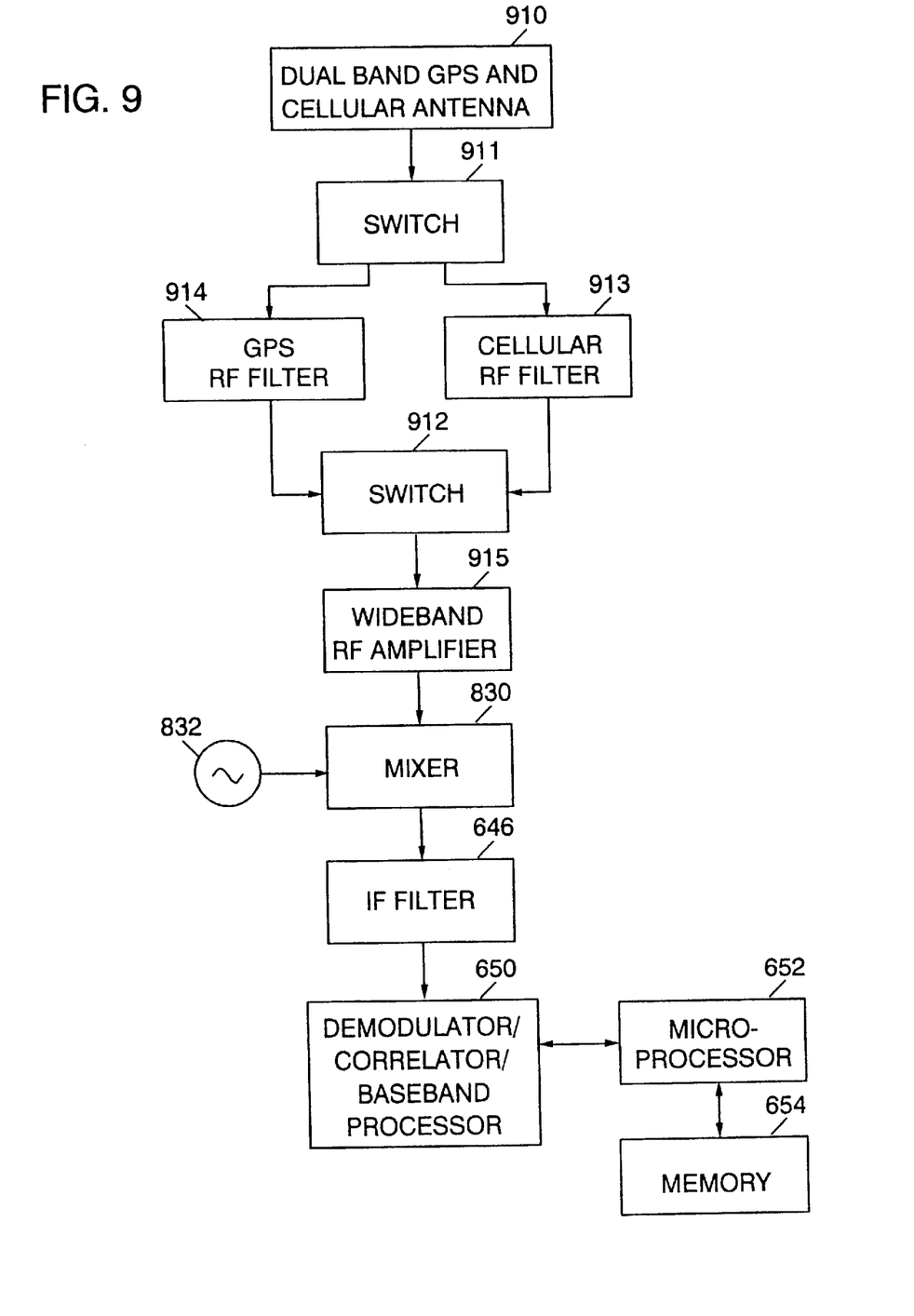

Referring now to FIG. 9, terminals and methods that share portions of the RF system are shown. As shown in FIG. 9, a dual band GPS and cellular antenna 910 can receive both GPS and wide band radiotelephone signals. A pair of switches 911 and 912 may be used to switch an appropriate GPS RF filter 914 or cellular filter 913. Although these filters are shown as being separate filters, they may be embodied as a shared filter with variable or switched elements. A wide band RF amplifier 915 is then provided, along with a mixer 830. Oscillator 832, IF filter 646, despreader 650, microprocessor 652 and memory 654, are also provided as was already described. It will also be understood that separate GPS and cellular antennas may be used rather than a dual band GPS and cellular antenna, in combination with a common wide band amplifier.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A wireless mobile terminal for a wireless communications system, comprising:
    a Global Positioning System (GPS) Radio Frequency (RF) receiver that receives GPS signals at a predetermined chip frequency;
    a Code Division Multiple Access (CDMA) radiotelephone RF receiver having bandwidth that is at least half as wide as the predetermined chip frequency that receives CDMA signals;
    a shared Intermediate Frequency (IF) section that is responsive to both the GPS RF receiver and to the CDMA radiotelephone RF receiver; and
    a shared CDMA despreader that is responsive to the shared IF section to despread both the GPS signals and the CDMA signals.

2. A wireless mobile terminal according to claim 1 wherein the GPS RF receiver and the CDMA radiotelephone RF receiver have similar bandwidth in different RF spectra.

3. A wireless mobile terminal according to claim 1 wherein the GPS RF receiver and the CDMA radiotelephone RF receiver have identical bandwidth in different RF spectra.

4. A wireless mobile terminal according to claim 1 wherein the GPS RF receiver comprises a GPS antenna and wherein the CDMA radiotelephone RF receiver comprises a CDMA radiotelephone antenna.

5. A wireless mobile terminal according to claim 1 further comprising a dual band antenna, wherein the GPS RF receiver comprises a GPS RF filter that is responsive to the dual band antenna and wherein the CDMA radiotelephone RF receiver comprises a spread spectrum RF filter that is responsive to the dual band antenna.

6. A wireless mobile terminal according to claim 5 further comprising a wideband RF amplifier that is responsive to the GPS RF filter and the spread spectrum RF filter.

7. A method of receiving wireless communications in a mobile terminal comprising the steps of:
    receiving Global Positioning System (GPS) Radio Frequency (RF) signals at a predetermined chip frequency on a first RF channel;
    receiving Code Division Multiple Access (CDMA) radiotelephone RF signals on a second RF channel, wherein the CDMA radiotelephone RF signals have bandwidth that is at least half as wide as the predetermined chip frequency; and
    despreading both the GPS RF signals and the CDMA radiotelephone RF signals in a shared despreader.

8. A method according to claim 7 wherein the GPS RF signals and the CDMA radiotelephone RF signals have similar bandwidth in different RF spectra.

9. A method according to claim 7 wherein the GPS RF signals and the CDMA radiotelephone RF signals have identical bandwidth in different RF spectra.

10. A method according to claim 9 wherein the demodulating step comprises the step of mixing both the GPS RF signals and the CDMA radiotelephone RF signals in a shared mixer.

11. A wireless mobile terminal for a wireless communications system, comprising:
    a Global Positioning System (GPS) Radio Frequency (RF) receiver that receives GPS signals at a predetermined chip frequency;
    a Code Division Multiple Access (CDMA) radiotelephone RF receiver having bandwidth that is at least half as wide as the predetermined chip frequency that receives CDMA signals;
    a GPS Intermediate Frequency (IF) section that is responsive to the GPS RF receiver;
    a CDMA radiotelephone IF section that is responsive to the CDMA radiotelephone RF receiver; and
    a shared spread spectrum despreader that is responsive to both the GPS IF section and to the CDMA radiotelephone IF section to despread both the GPS signals and the CDMA signals.

12. A wireless mobile terminal according to claim 11 wherein the GPS RF receiver and the CDMA radiotelephone RF receiver have similar bandwidth in different RF spectra.

13. A wireless mobile terminal according to claim 11 wherein the GPS RF receiver and the CDMA radiotelephone RF receiver have identical bandwidth in different RF spectra.

14. A wireless mobile terminal according to claim 11 wherein the GPS RF receiver comprises a GPS antenna and wherein the CDMA radiotelephone RF receiver comprises a CDMA radiotelephone antenna.

15. A wireless mobile terminal according to claim 11 wherein the GPS IF section and the CDMA radiotelephone IF section comprise a shared local oscillator.

16. A method of receiving wireless communications in a mobile terminal comprising the steps of:
    receiving Global Positioning System (GPS) Radio Frequency (RF) signals at a predetermined chip frequency on a first RF channel;
    receiving Code Division Multiple Access (CDMA) radiotelephone signals on a second RF channel, wherein the CDMA radiotelephone signals have bandwidth at least half as wide as the predetermined chip frequency;
    separately mixing the GPS RF signals and the CDMA radiotelephone signals in separate GPS and wide bandwidth radiotelephone mixers; and
    despreading both the mixed GPS RF signals and the mixed wide bandwidth radiotelephone signals in a shared despreader.

17. A method according to claim 16 wherein the GPS RF signals and the CDMA radiotelephone RF signals have similar bandwidth in different RF spectra.

18. A method according to claim 16 wherein the GPS RF signals and the CDMA radiotelephone RF signals have identical bandwidth in different RF spectra.

19. A wireless mobile terminal for a wireless communications system, comprising:
    a global positioning system (GPS) receiver that receives GPS signals at a predetermined chip frequency; and
    a Code Division Multiple Access (CDMA) radiotelephone receiver having bandwidth at least half as wide as the predetermined chip frequency, that receives CDMA signals;
    wherein the GPS receiver and the CDMA radiotelephone receiver share a spread spectrum despreader to despread both the GPS signals and the CDMA signals.

20. A wireless mobile terminal according to claim 19 wherein the wherein the GPS receiver and the CDMA radiotelephone receiver also share a mixer.

21. A wireless mobile terminal according to claim 19 wherein the GPS receiver and the CDMA radiotelephone receiver have identical bandwidth in different radio frequency spectra.

* * * * *

UNITED STATES PATENT AND TRADEMARK OFFICE
CERTIFICATE OF CORRECTION

PATENT NO. : 6,097,974  
DATED : August 1, 2000  
INVENTOR(S) : Camp, Jr. et al.

Page 1 of 1

It is certified that error appears in the above-identified patent and that said Letters Patent is hereby corrected as shown below:

<u>Column 7,</u>
Line 59, please delete "9" and substitute -- 7 -- therefor.

Signed and Sealed this

Eighteenth Day of December, 2001

Attest:

JAMES E. ROGAN
*Attesting Officer*  *Director of the United States Patent and Trademark Office*